(12) United States Patent  (10) Patent No.: US 7,444,074 B2
Shibasaki  (45) Date of Patent: Oct. 28, 2008

(54) AUTOFOCUS LENS APPARATUS AND CAMERA SYSTEM WITH THE SAME

(75) Inventor: Gou Shibasaki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 396 days.

(21) Appl. No.: 11/446,842

(22) Filed: Jun. 5, 2006

(65) Prior Publication Data

US 2006/0280491 A1 Dec. 14, 2006

(30) Foreign Application Priority Data

Jun. 8, 2005 (JP) ............... 2005-168514
Sep. 13, 2005 (JP) ............... 2005-266062
May 25, 2006 (JP) ............... 2006-146356

(51) Int. Cl.
*G03B 3/10* (2006.01)

(52) U.S. Cl. ............... 396/121; 396/82; 396/88; 396/137; 396/148; 348/373; 359/824

(58) Field of Classification Search ................ 396/121, 396/147; 348/345–357
See application file for complete search history.

(56) References Cited

U.S. PATENT DOCUMENTS

| | | | | |
|---|---|---|---|---|
| 5,485,239 A | * | 1/1996 | Ohsawa | 396/51 |
| 5,731,919 A | * | 3/1998 | Yamamoto | 359/824 |
| 6,724,429 B2 | * | 4/2004 | Shore et al. | 348/373 |
| 6,859,619 B2 | * | 2/2005 | Kurosawa | 396/88 |
| 7,142,780 B2 | * | 11/2006 | Katagishi | 396/54 |
| 7,209,175 B1 | * | 4/2007 | Kurokawa et al. | 348/345 |
| 2005/0264680 A1 | * | 12/2005 | Yajima | 348/345 |

FOREIGN PATENT DOCUMENTS

| | | |
|---|---|---|
| JP | 6-141226 | 5/1994 |
| JP | 2003-177294 | 6/2003 |

OTHER PUBLICATIONS

Jurrien, Ilse, "Pentax K100D", May 23, 2006, LetsGoDigital.*

* cited by examiner

*Primary Examiner*—Patrick J Assouad
*Assistant Examiner*—Linda B Smith
(74) *Attorney, Agent, or Firm*—Morgan & Finnegan LLP

(57) ABSTRACT

An autofocus lens apparatus is disclosed which is capable of changing a focus target area in position and size without degrading the operability of manual focusing when taking images with an autofocus function. The autofocus lens apparatus comprises an operating member which is placed outside a lens barrel and movable to change the focus target area, a detector which detects the movement of the operating member, and a controller which changes at least one of the position and size of the focus target area on the basis of a signal from the detector.

17 Claims, 12 Drawing Sheets

PRIOR ART

AUTOFOCUS LENS APPARATUS AND CAMERA SYSTEM WITH THE SAME

BACKGROUND OF THE INVENTION

The present invention relates to an autofocus lens apparatus and an camera system including an image-taking apparatus such as a television camera on which the autofocus lens apparatus is mounted.

Lens apparatuses attached to a television camera are generally used in such a manner that a camera operator P places the television camera 1 on his/her shoulder, holds a grip portion 3 provided in a lens barrel 2 of the lens apparatus with his/her right hand, and operates an operation ring rotatably provided on the outer circumference of the lens barrel 2 with his/her left hand, as shown in FIG. 11.

FIG. 11 is a plane view showing a typical lens apparatus. The lens apparatus incorporates a focusing lens unit, a magnification-varying lens unit and an iris, not shown, in its lens barrel 2. The rotational operations of a focus ring 4, a zoom ring 5 and an iris ring 6 which are operation rings provided on the lens barrel 2 enable focusing, varying the magnification and light-amount adjustment, respectively. In the grip portion 3, driving motors, not shown, for electrically driving the operation rings and a controller, not shown, for controlling the driving motors are provided. In addition, on the surface of the grip portion 3, switches which give instructions to the controller are provided such as a zoom operating switch 7, an iris operating switch 8, a return switch 9, and a record switch for instructing start/stop of recording, not shown. These switches are operated by the camera operator with his/her right hand's finger.

When the lens apparatus has an autofocus function, a calculation means, which is provided in the lens apparatus or the television camera, determines the degree of focusing on the basis of image signals from an image-taking region and controls the position of the focusing lens unit via a driving means provided in the lens apparatus, thereby making it possible to obtain an in-focus state automatically.

Even when image-taking is performed with the autofocus lens apparatus, a manual focusing operation of the focus ring 4 with the camera operator's left hand is necessary in cases such as a case where the focus mode is changed quickly from the autofocus mode to the manual focus mode, a case where the camera operator uses the autofocus function as an auxiliary function for manual focusing, a case where the lens apparatus has focused on an object different from the object intended by the camera operator, and a case where the camera operator intends to obtain an out-of-focus state as an image effect.

There are some methods for determining the degree of focusing on the basis of image signals from an image-taking area, such as the so-called contrast detection method and the so-called phase difference detection method. In these methods, the degree of focusing is determined on the basis of image signals from the focus target area in the image-taking region.

When the focus target area is fixed at the center of the image-taking region, the lens apparatus cannot focus on an object away from the center of the image-taking region, which inevitably limits the image-taking condition with a composition in which the object to be focused on is placed at the center of the image-taking region. Therefore, to enable the lens apparatus to focus on an arbitrary object, it would be convenient to change the focus target area in position and size according to the object.

In contrast, a television camera apparatus has been disclosed in, for example, Japanese Patent Laid-Open No. H06 (1994)-141226, which is capable of changing the focus target area in position and size according to a camera operator's operation through an operating member provided on a television camera such as a track ball, joystick, touch panel provided in a viewfinder.

Since the camera operator supports the grip portion 3 and operates the plural switches with his/her right hand in image-taking as described above, he/she needs to do the operation for changing the focus target area with his/her left hand. However, since the camera operator needs to absolutely release his/her left hand from the focus ring 4 when he/she does the operation for changing the focus target area in the conventional configuration, it is difficult to take images smoothly in, for example, a case where he/she manually adjusts the degree of focusing.

The use of a command ring as a focus-area-changing ring has been disclosed in Japanese Patent Laid-Open No. 2003-177294. The command ring is rotatable endlessly in the right and left directions and is an item-selecting operation part having a click stop mechanism which temporarily fixes the command ring at each predetermined rotational angular position. Information of rotational directions and rotational amounts (that is, information of the number of exceeded click stops) is send from the command ring to a CPU in the lens apparatus.

According to this configuration, the focus target area can be selected without the absolute release of the camera operator's left hand from the focus ring. However, it is difficult to move the focus target area quickly to a desired position because the selecting operation is an item-selecting operation by the rotation of the command ring.

In particular, in an autofocus lens apparatus mounted on a television camera for taking moving images, the image-taking is continued during the movement of the focus target area. Therefore, there is a problem that a sequential selecting operation of the focus target area is not allowed but a direct movement of the focus target area to a desired position is required.

BRIEF SUMMARY OF THE INVENTION

An object of the present invention is to provide an autofocus lens apparatus capable of changing the focus target area in position and size through an operating member to resolve the above-described problem and a camera system with the same.

According to an aspect, the present invention provides an autofocus lens apparatus which includes a focusing optical member movable in a lens barrel of the lens apparatus and automatically drives the focusing optical member on the basis of an image signal of a focus target area in an image-taking region to control the focusing optical member to an in-focus state. The autofocus lens apparatus comprises an operating member which is placed outside the lens barrel and is movable in a direction orthogonal to an optical axis of the lens barrel, a detector which detects the movement of the operating member, and a controller which moves the focus target area in a direction of the movement of the operating member on the basis of a signal from the detector.

According to another aspect, the present invention provides an autofocus lens apparatus which comprises an operating member which is placed outside the lens barrel and is rotatable around an optical axis of the lens barrel, a detector which detects the rotation of the operating member, and a controller which changes the size of the focus target area on the basis of a signal from the detector.

Furthermore, according to still another aspect, the present invention provides a camera system which comprises the above-described autofocus lens apparatus and an image-taking apparatus.

Other objects and features of the present invention will become readily apparent from the following description of the preferred embodiments with reference to accompanying drawings.

DETAILED DESCRIPTION OF THE PREFERRED EMBODIMENTS

Preferred embodiments of the present invention will hereinafter be described with reference to the drawings.

Embodiment 1

Figure 1:
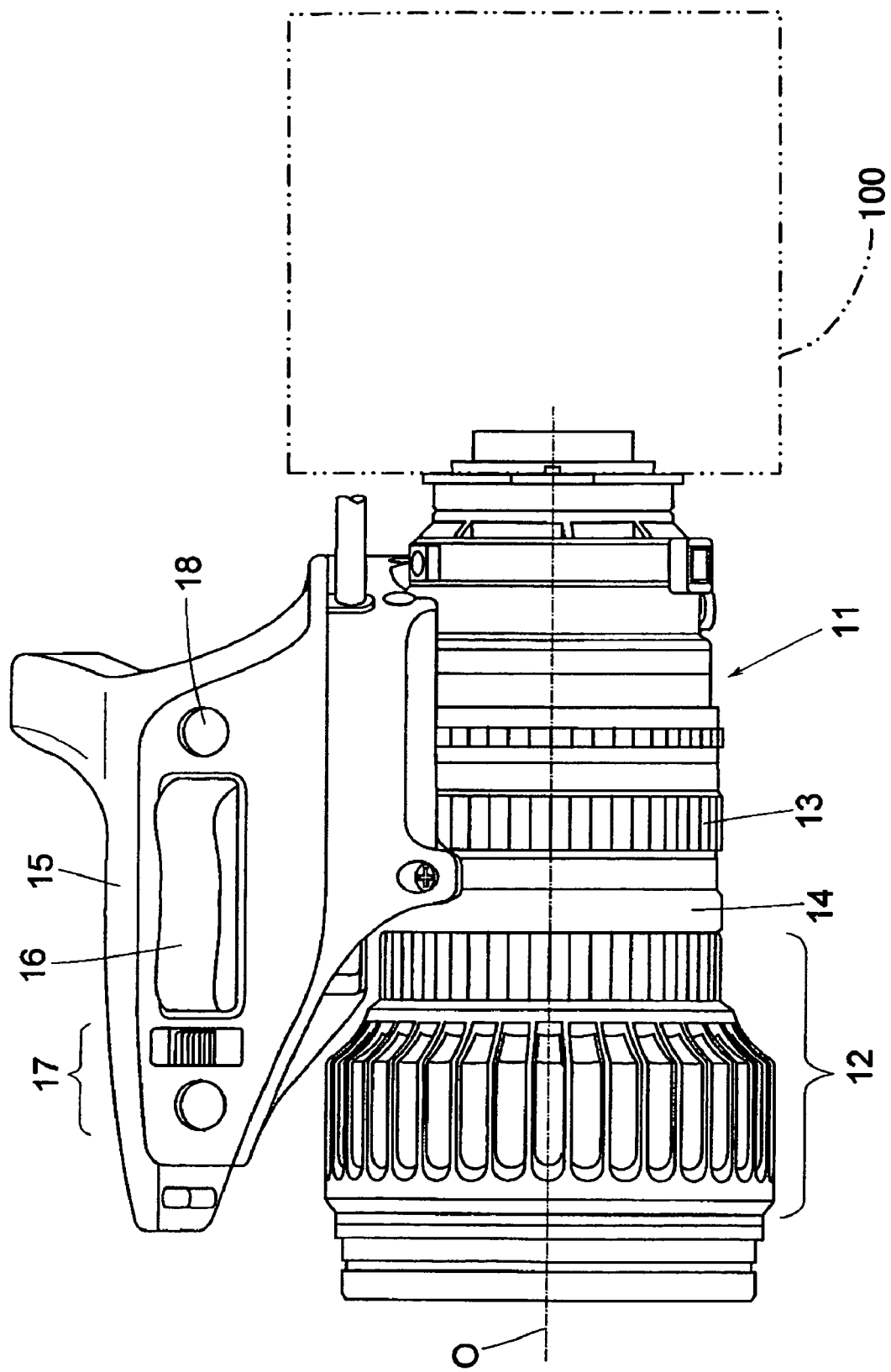
FIG. 1 is a plane view showing Embodiment 1 of the present invention.

FIG. 1 is a plane view showing the autofocus lens apparatus that is Embodiment 1 of the present invention. 100 denotes a television camera on which the lens apparatus is mounted.

On the outer circumference of a fixed lens barrel 11 of the lens apparatus, a focus ring 12 and a zoom ring 13 are provided and a ring-like shaped operating member 14 which surrounds the outer circumferential area of the lens barrel 11 between the focus ring 12 and the zoom ring 13 is provided. A grip portion 15 is fixed to the side part of the lens barrel 11. A zoom operating switch 16, an iris operating switch 17, and a return switch 18 are provided on the grip portion 15.

Since the lens barrel 11 and the grip portion 15 are connected with each other, the orientation of the lens barrel 11 is fixed during image-taking in which the grip portion 15 is held with a camera operator's right hand. The focus ring 12 which surrounds the lens barrel 11 is rotatable around the optical axis O automatically and manually. The rotational operation of the focus ring 12 moves a focus lens unit, not shown, inside the lens barrel 11 in the optical axis direction.

The zoom ring 13 also surrounds the lens barrel 11 and is rotationally-slidable around the optical axis O. The rotational operation of the zoom ring 13 moves a magnification-varying lens unit, not shown, inside the lens barrel 11 in the optical axis direction. The operating member 14 is rotatable around the optical axis O in a small angle and movable in a direction orthogonal to the optical axis direction in a small range.

Figure 2:
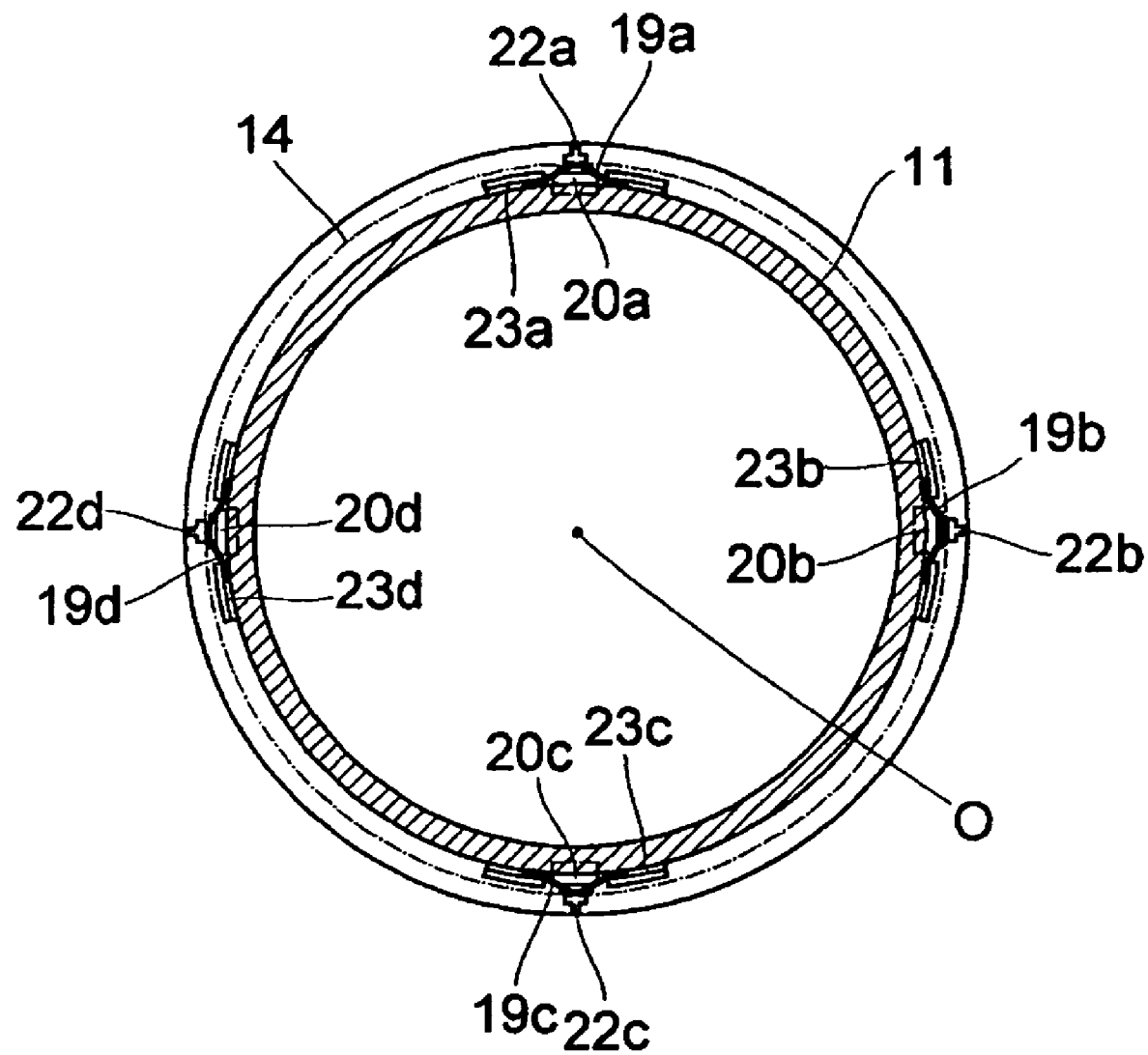
FIG. 2 is a transverse sectional view showing the main part of Embodiment 1.

FIG. 2 is a transverse sectional view showing the main part relating to the operating member 14 when viewed from the object side. Four pairs of arc-like shaped leaf springs 19a to 19d and contact switches 20a to 20d are provided at four parts on, for example, the lens barrel 11 between the lens barrel 11 and the operating member 14, respectively.

Figure 3:
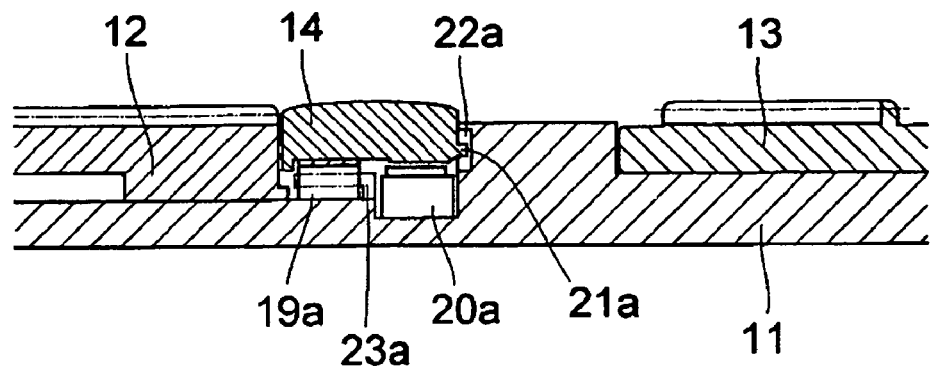
FIG. 3 is a longitudinal sectional view showing the main part of Embodiment 1.
Figure 3:
Figure 4:
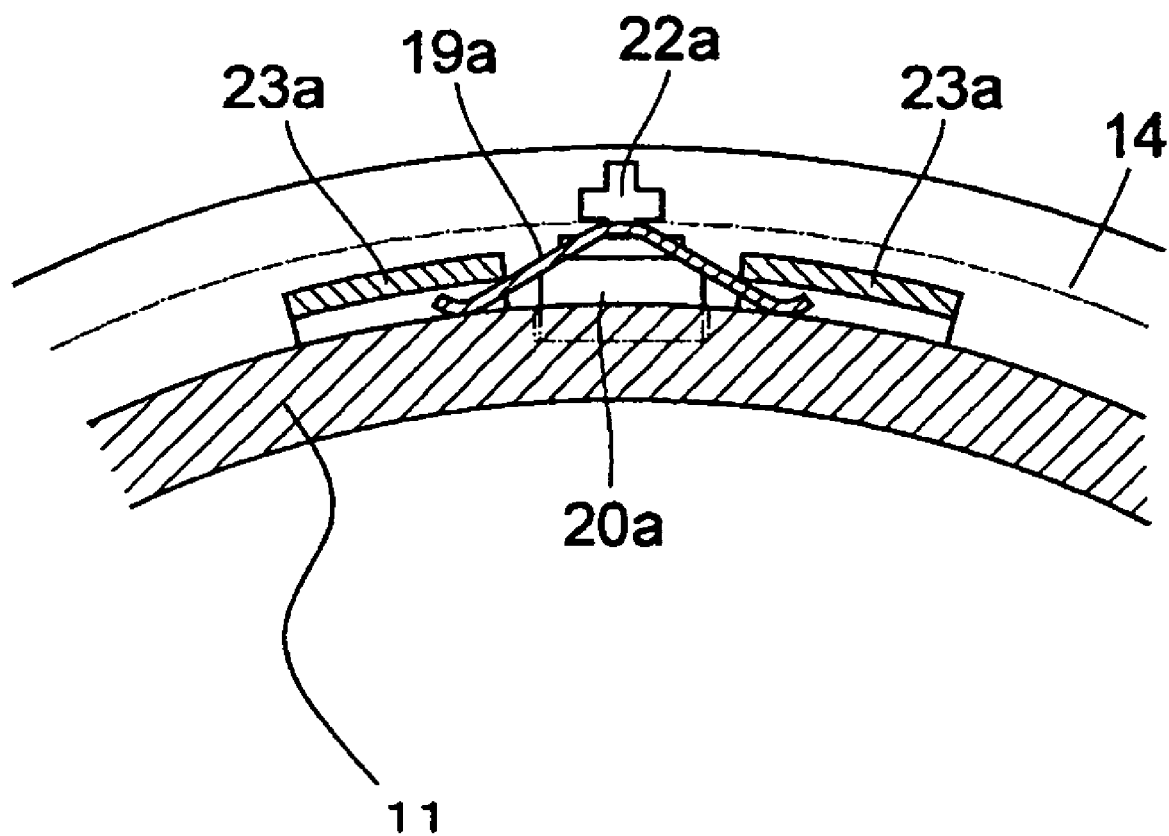
FIG. 4 is a partially enlarged view of FIG. 2.

FIG. 3 is a longitudinal sectional view showing the main part, and FIG. 4 is a partially enlarged view of FIG. 2. Column-shaped protrusions 21a to 21d are formed on the surface facing the optical axis direction of the operating member 14. Cross grooves 22a to 22d are formed on the surface orthogonal to the optical axis direction of the lens barrel 11, the protrusions 21a to 21d being inserted into the cross grooves 22a to 22d. The leaf springs 19a to 19d are engaged with engaging portions 23a to 23d formed on the lens barrel 11. The leaf springs 19a to 19d are in contact with the inner diameter portion of the operating member 14 at each top of the arc-like curved portion to bias the operating member 14 towards the outer diameter direction.

The cross grooves 22a to 22d act as a guide for the protrusions 21a to 21d, so that the movement of the operating member 14 other than a small movement along the cross grooves 22a to 22d in the plane orthogonal to the optical axis O is limited. The contact switches 20a to 20d are located near the inner diameter portion of the operating member 14 to detect the movement of the operating member 14 in the inner diameter direction.

According to this structure, when the operating member 14 is pushed from above in the camera operator's view, it is moved downward with respect to the lens barrel 11 and the inner diameter portion of the operating member 14 presses the contact switch 20a to turn it on.

Releasing the pushing force on the operating member 14 allows it to return to the neutral position by the restoring force of the leaf spring 19a, and the contact switch 20a thereby is turned off. In a similar manner, when the operating member 14 is pushed from left, below and right in the camera operator's view, the contact switch 20b, 20c, and 20d are turned on, respectively.

Figure 5:
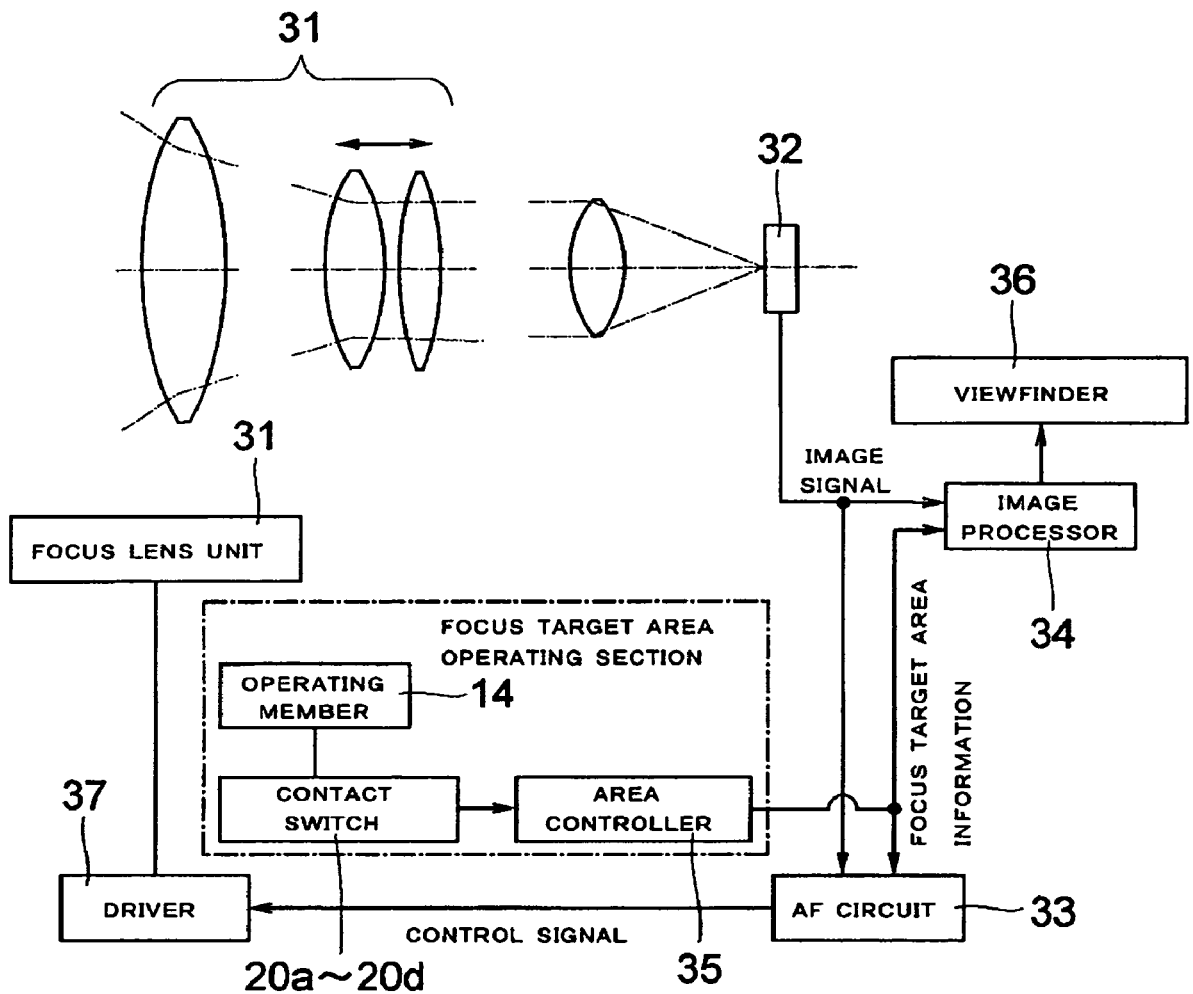
FIG. 5 is a block diagram showing the electric structure of Embodiment 1.

FIG. 5 is a block diagram showing the electric structure of the lens apparatus. When taking images with the autofocus function, light which passed through the lens system including the focusing lens unit 31 forms an object image on an image-pickup element 32.

The image signals from the image-pickup element 32 are sent to an AF circuit 33 and an image processor 34. The outputs from the contact switches 20a to 20d, which detect the operation of the operating member 14 and are included in a focus target area operating section, are sent to the AF circuit 33 and the image processor 34 via an area controller 35. The output from the image processor 34 is sent to a viewfinder 36. The output from the AF circuit 33 is sent to a driver 37 which drives the focusing lens unit 31.

In the focus target area operating section, the area controller 35 calculates the change amount of the focus target area, which is an area to evaluate the degree of focusing in the image-taking region (image-taking screen), and information of the focus target area from the area controller 35 is transmitted to the AF circuit 33.

Figure 6:
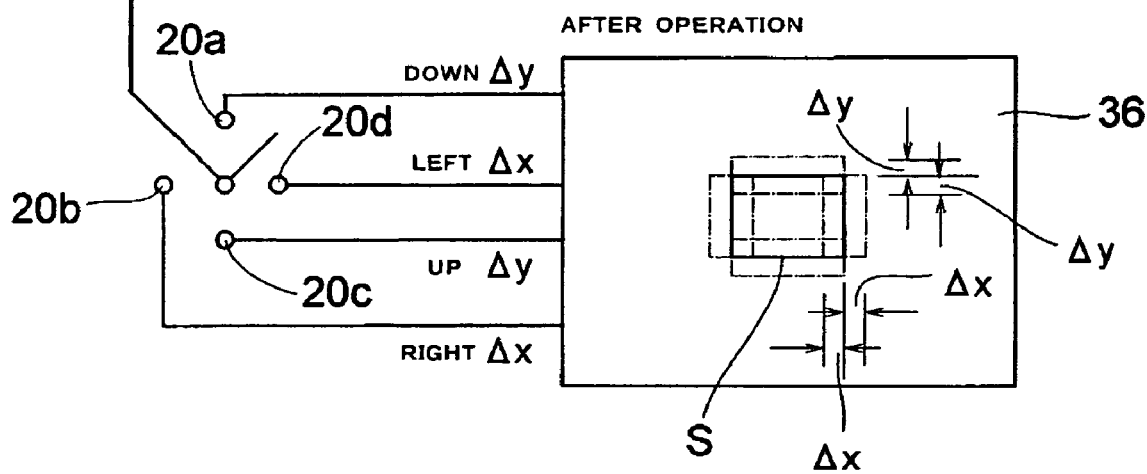
FIG. 6 is an explanatory diagram showing the movement of the focus target area in Embodiment 1.

As shown in FIG. 6, when the contact switch 20a is turned on, the area controller 35 performs a calculation to move the focus target area S in the image-taking screen of the viewfinder 36 downward by a movement amount Δy. In a similar manner, when the contact switch 20b and 20d are turned on, the focus target area S is moved rightward and leftward by a movement amount Δx, respectively. When the contact switch 20c is turned on, the focus target area S is moved upward by the movement amount Δy.

The AF circuit 33 determines the degree of focusing on the basis of the image signal of the focus target area S in the image-taking screen, and sends a control signal for obtaining an in-focus state to the driver 37 which drives the focusing lens unit 31. The image signal from the image-pickup element 32 and the focus target area information from the area controller 35 are sent to the image processor 34 in the television camera 100, and the taken image and the focus target area S shown in FIG. 6 thereby are displayed on the viewfinder 36.

Figure 10:
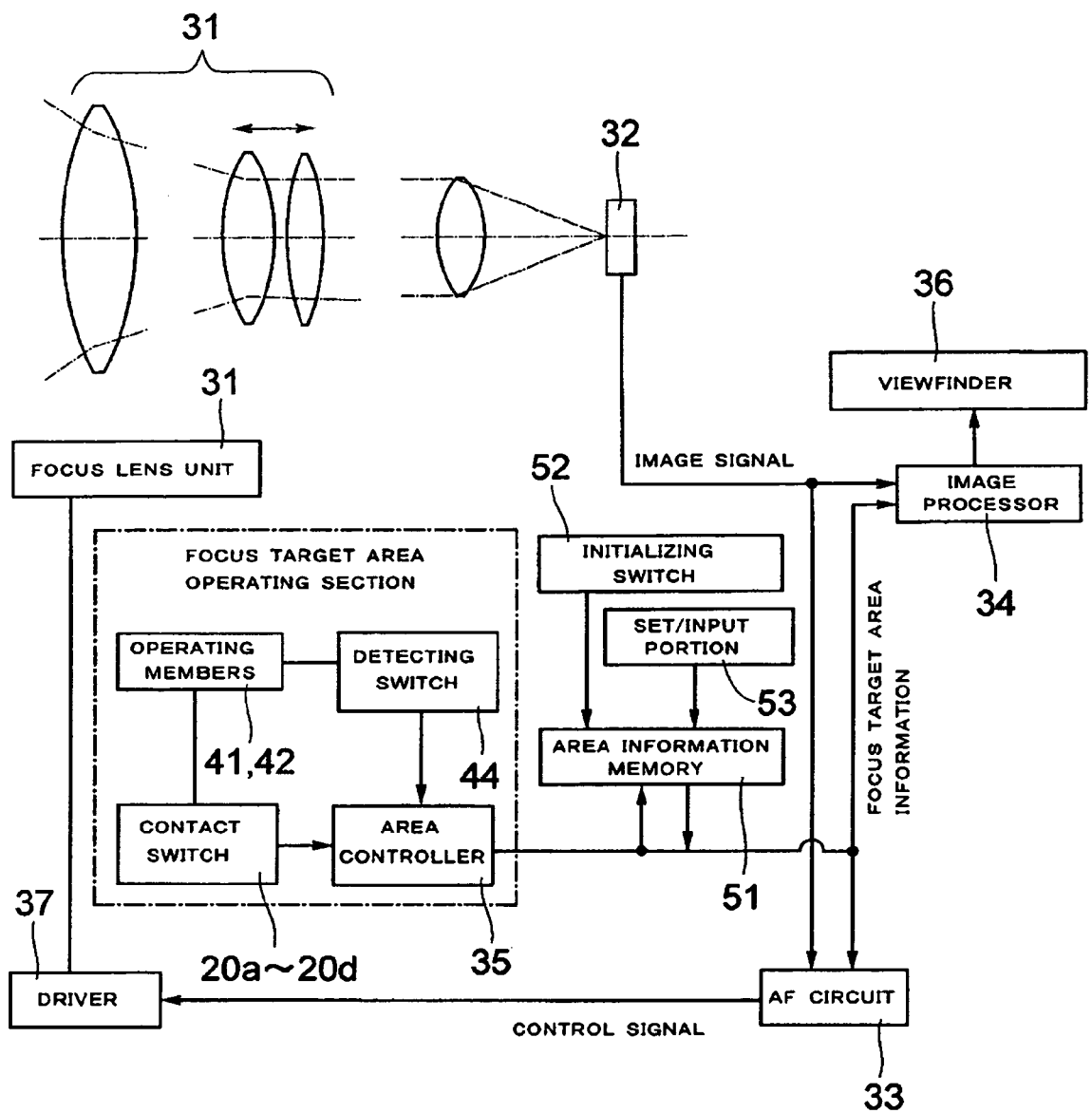
FIG. 10 is a block diagram showing the electric structure of Embodiment 2.
Figure 11:
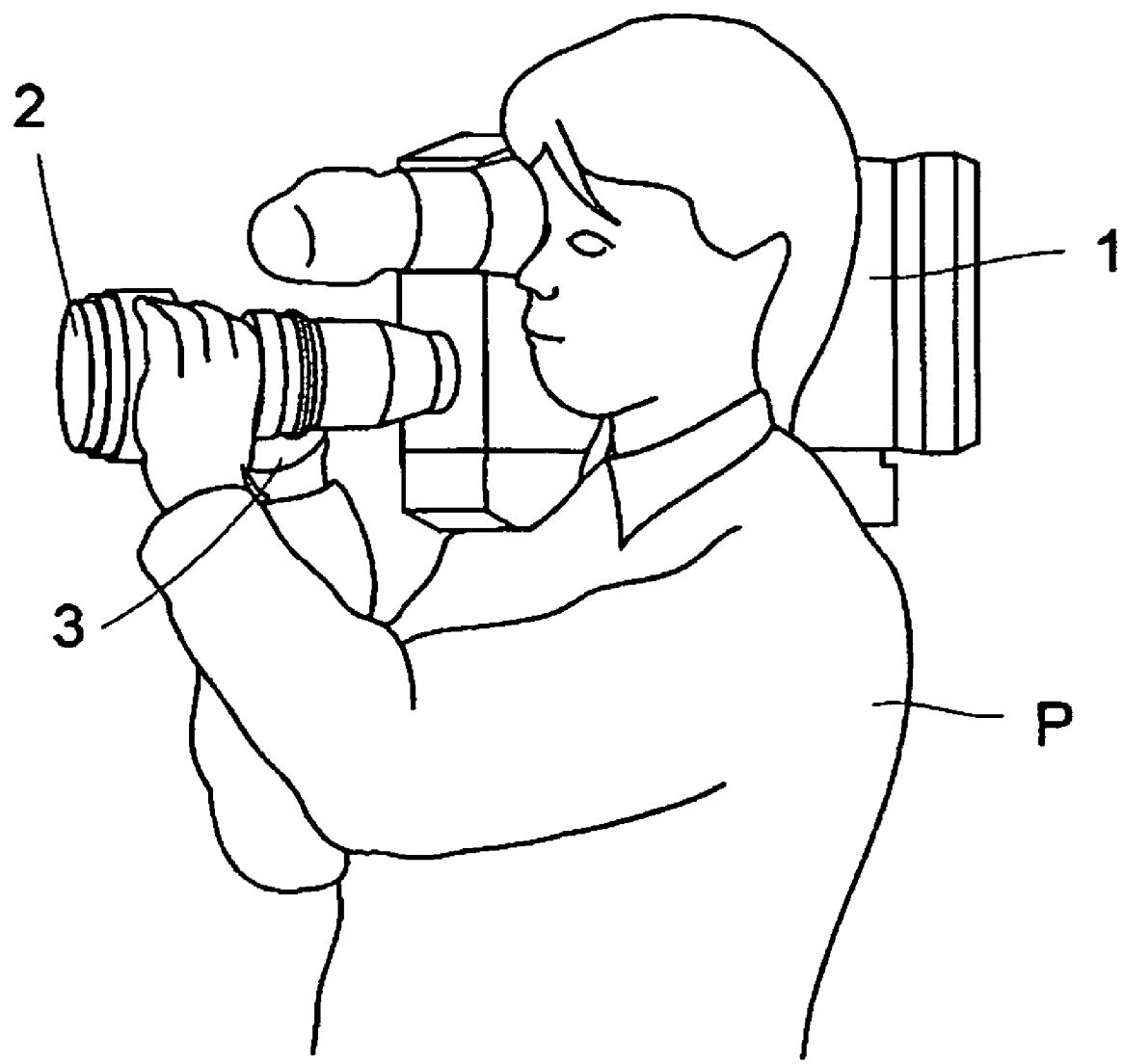
FIG. 11 is an explanatory diagram showing a usage pattern of a conventional lens apparatus.
Figure 12:
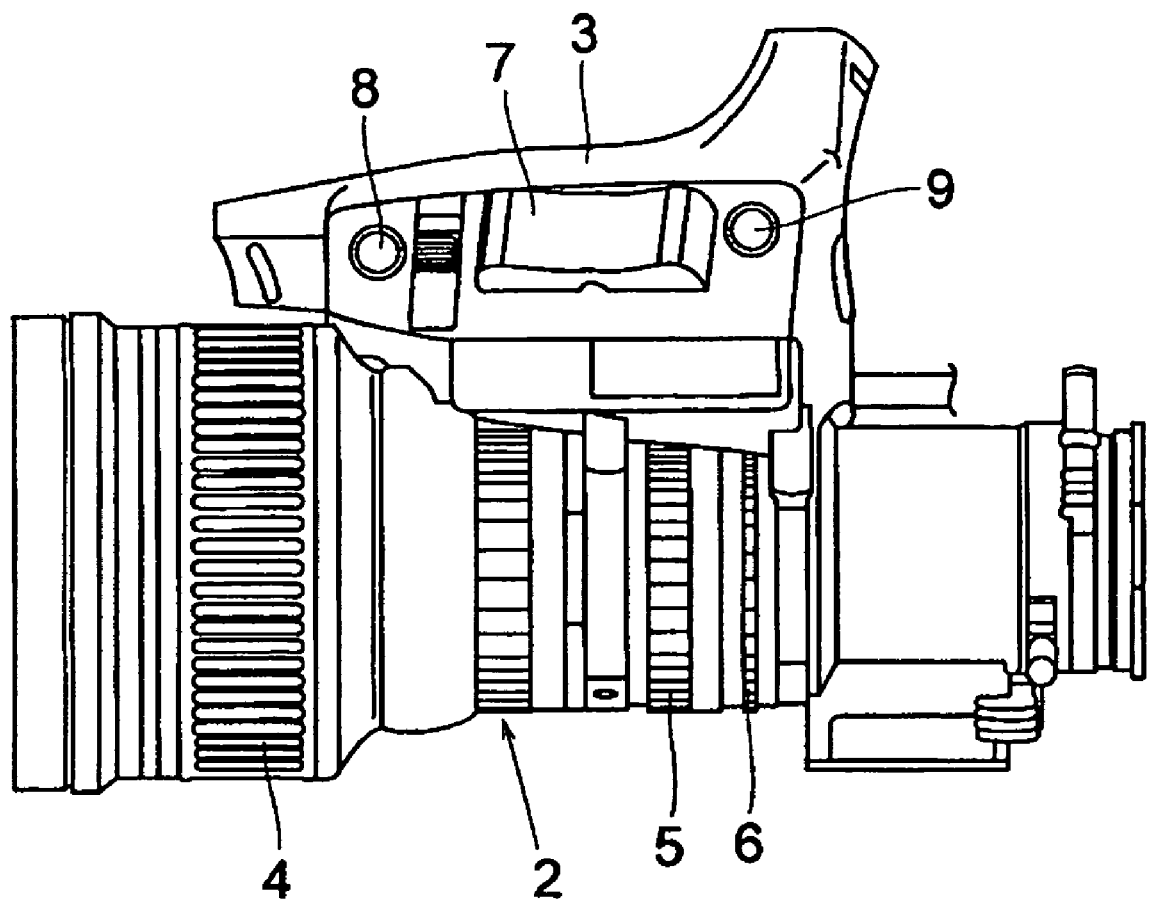
FIG. 12 is a plane view showing the conventional lens apparatus.

This autofocus lens apparatus is used in a similar manner to the conventional one shown in FIG. 10. In other words, a camera operator places the television camera on which the lens apparatus is mounted on his/her right shoulder and holds the grip portion 15 of the lens apparatus with his/her right hand. The camera operator takes images while watching the displayed images on the viewfinder 36.

When the operating member 14 is moved leftward in parallel in the operator's view with the operator's left hand, the focus target area S displayed on the viewfinder 36 moves leftward by Δx on the screen. Therefore, the focusing lens unit 31 is controlled so as to focus on the moved focus target area S. When the operating member 14 is moved leftward again in the operator's view after once releasing the operating force on it, the focus target area S further moves leftward by Δx on the screen.

As described above, the camera operator holds the operating member 14 with his/her left hand, and repeats moving and releasing operations thereof in an arbitrary one of up, down, right and left directions in the operator's view, thereby making it possible to move the focus target area S to a desired position to obtain an in-focus state on the object in the focus target area S.

Since the operating member 14 is located near the focus ring 12, instantaneous transitions between the operation for moving the focus target area S in the image-taking screen and the rotational operation of the focus ring 12 for manual adjustment of the degree of focusing is easy, thereby making it possible to take images smoothly. Further, since the operating member 14 enables the direct movement of the focus target area S to a desired position, it is possible to change the focus target area S more quickly than a case where a sequential operation to select the focus target area is required.

According to the camera system of the present invention which is constituted by attaching the above-described autofocus lens apparatus to the image-taking apparatus such as a television camera, since the operating member enables the direct movement of the focus target area to a desired position, image disturbance caused by the sequential operation to select the focus target area is prevented.

Embodiment 2

Figure 7:
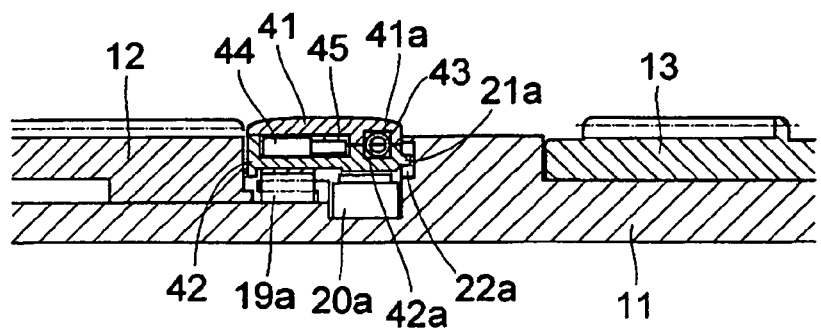
FIG. 7 is a transverse sectional view showing the main part of Embodiment 2 of the present invention.
Figure 7:

FIG. 7 is a transverse sectional view showing the main part of the autofocus lens apparatus that is Embodiment 2. In this figure, the same reference numerals as in Embodiment 1 denote the same members as in Embodiment 1. The operating member in this embodiment is constituted by two separate members that are an outer operating member 41 and an inner operating member 42.

The outer operating member 41 engages with the inner operating member 42, and they are movable in a direction orthogonal to the optical axis O as one member. The outer operating member 41 is slidable with respect to the inner operating member 42 in the circumferential direction of the optical axis O. At least one pair of arc grooves 41a and 42a is formed on the inner circumferential surface of the outer operating member 41 and the outer circumferential surface of the inner operating member 42. A compression coil spring 43 is placed in a space formed by the arc grooves 41a and 42a and extending in the circumferential direction.

A lever-type detecting switch 44 is fixed to the inner operating member 42. The detecting switch 44 has a lever portion 47 which contains a neutral return mechanism. The detecting switch 44 generates different electrical signals according to a clockwise movement and a counterclockwise movement of the outer operating member 41 with reference to its neutral position when the lever portion 45 reaches a predetermined turn angle.

Figure 8:
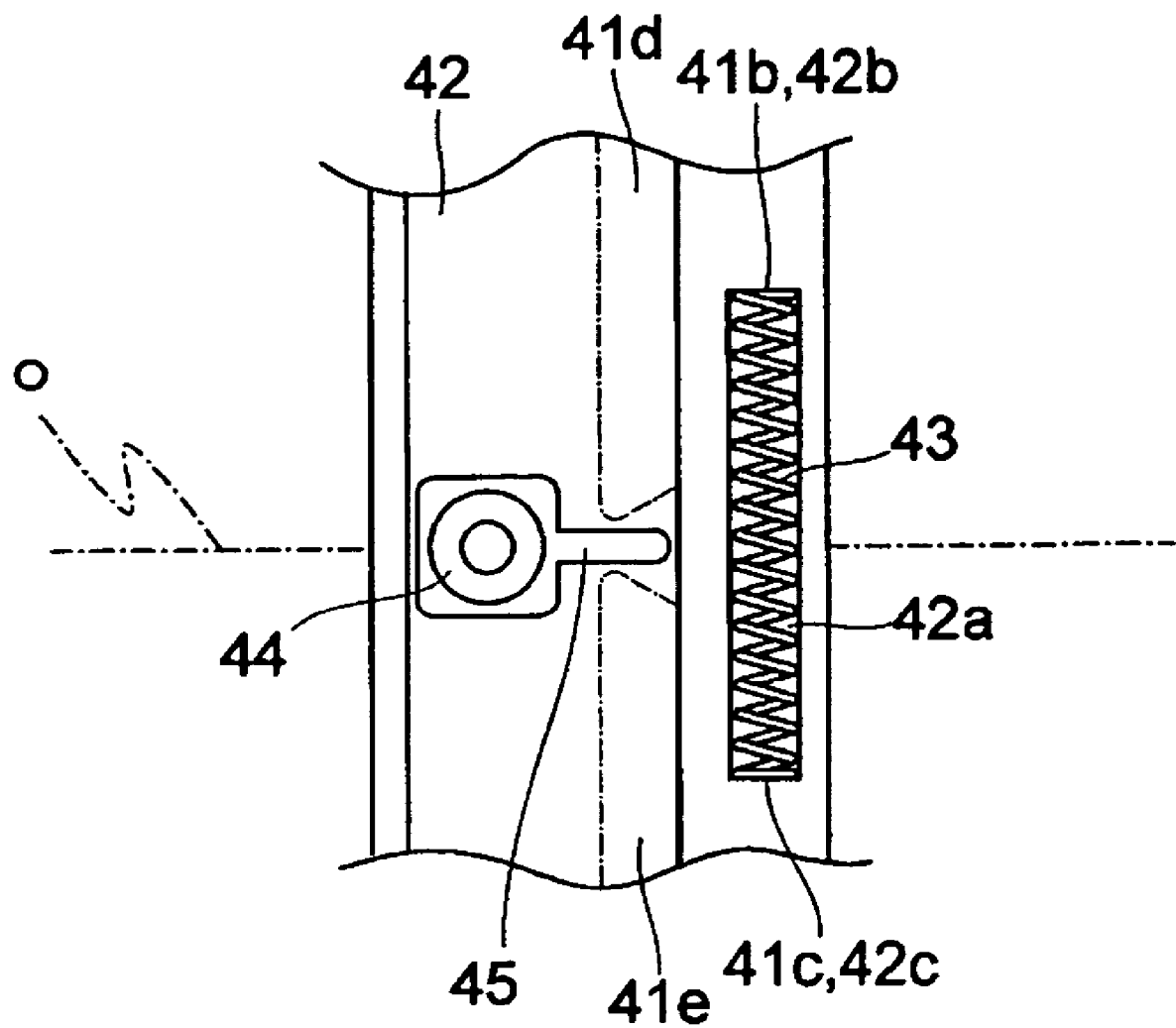
FIG. 8 is a plane view showing the periphery of the detecting switch of Embodiment 2.

FIG. 8 is a plane view showing the periphery of the detecting switch 44. The end faces 41b and 41c of the arc groove 41a and the end faces 42b and 42c of the arc groove 42a are pressed by the compression coil spring 43 placed in the arc grooves 41a and 42a. When the outer operating member 41 is located at its neutral position, the end faces 41b and 42b and the end faces 41c and 42c match in position, respectively. In this state, the lever portion 45 of the detecting switch 44 is sandwiched between the protrusions 41d and 41e formed on a part of the inner circumferential portion of the outer operating member 41, and located at its neutral position.

Figure 9:
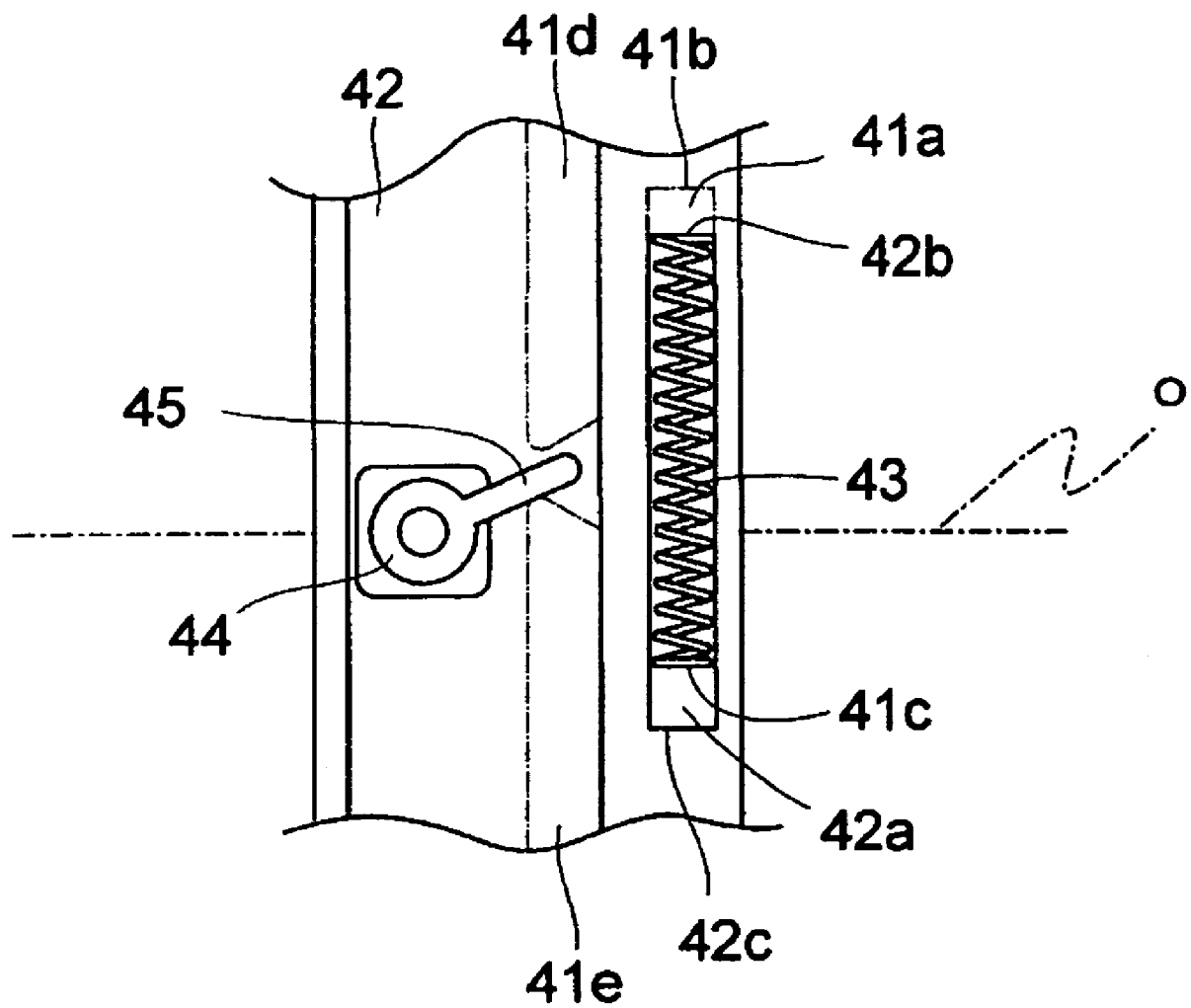
FIG. 9 is an explanatory diagram showing the action of the detecting switch of Embodiment 2.

According to the above-described structure, the clockwise rotation of the outer operating member 41 with respect to the inner operating member 42 in the operator's view changes the positional relationship between the operating members 41 and 42 as shown in FIG. 9. Specifically, the protrusion 41e of the outer operating member 41 comes into contact with the lever portion 45 of the detecting switch 44 and turns the lever portion 45 in the counterclockwise direction. When the turning angle of the lever portion 45 reaches a predetermined angle, the detecting switch 44 generates a detection signal indicating a counterclockwise rotation.

On the other hand, in the state shown in FIG. 9, the compression coil spring 43 is compressed further than in the neutral state. Releasing the operating force to rotate the outer operating member 41 allows it to return the neutral position by the restoring force of the compression coil spring 43, and the detecting switch 44 thereby is turned off.

In a similar manner, the counterclockwise rotation of the outer operating member 41 with respect to the inner operating member 42 in the operator's view causes the detecting switch 44 to generate a detection signal indicating a clockwise rotation.

FIG. 10 is a block diagram showing the electric structure of Embodiment 2. The same reference numerals as in Embodiment 1 denote the same components as in Embodiment 1.

In the focus target area operating section, the outputs from the contact switches 20a to 20d which detect the operation of the outer and inner operating members 41 and 42 and the output from the detecting switch 44 are sent to the area controller 35.

The output from the area controller 35 is sent to the AF circuit 33 and an area information memory 51. The area information memory 51 receives the outputs from an initializing switch 52 and a set/input part 53, which are provided in the lens apparatus.

The area controller 35 performs calculations for increasing the size of the focus target area S by one step according to the detection signal indicating the counterclockwise rotation from the detecting switch 44 and for decreasing the size thereof one step according to the detection signal indicating the clockwise rotation.

The area information memory 51 stores the predetermined value relating to the position and size of the focus target area S and the focus target area information from the area controller 35. The focus target area information from the area controller 35 is overwritten every time it changes.

The predetermined value relating to the position and size of the focus target area S is arbitrarily changeable through the set/input part 53. The area information memory 51 can hold the stored information while the apparatus stops its operation (in other words, the apparatus is dormant) after the power is turned off.

The predetermined value stored in the area information memory 51 is sent to the AF circuit 33 and the image processor 34 as the focus target area information when the initializing switch 52 provided in the lens apparatus is turned on. On the other hand, when restarting the operation of the lens apparatus from the dormant state, the last focus target area information stored in the area information memory 51 immediately before entering the dormant state and held during the dormant period is also sent to the AF circuit 33 and the image processor 34.

In the present Embodiment 2, as in Embodiment 1, the operation of the outer operating member 41 in the up, down, right and left directions in the operator's view moves the operating members 41 and 42 integrally in the diameter direction, thereby making it possible to move the focus target area S in the image-taking screen in the up, down, right and left directions.

On the other hand, adding the clockwise force on the outer operating member 41 in the operator's view rotates only the outer operating member 41 in the clockwise direction, thereby increasing the size of the focus target area S displayed on the viewfinder 36 by one step.

Releasing the operating force on the outer and inner operating members 41 and 42 to return them to the neutral position and rotating the outer operating member 41 in the same direction again further increases the size of the focus target area S. In a similar manner, rotating the outer operating member 41 in the counterclockwise direction in the operator's view decreases the size of the focus target area S.

The outer operating member 41 is located near the focus ring 12, which enables instantaneous transitions between the operation of the outer operating member 41 for changing the focus target area S and the operation of the focus ring 12 for manual focusing. Turning the initializing switch 52 on enables immediate retuning of the focus target area S, which was changed to an arbitrary area, to the focus target area corresponding to the predetermined area condition.

The time for changing the focus target area to the area corresponding to the predetermined area condition from the timing of the operation of the initializing switch 52 is not particularly limited. The present invention includes a configuration which enables arbitrary setting of the time or the speed required for smooth changing of the focus target area to obtain a desired image effect.

In addition, since the last area information of the focus target area S is held in the area information memory 51 even if the lens apparatus becomes dormant, it is possible, when restarting the apparatus, to start image-taking under the same condition as immediately before entering the dormant state.

Although this embodiment employs the configuration in which, when restarting the lens apparatus, the initial focus target area is set to the same area as immediately before entering the dormant state, a configuration can be employed in which the initial focus target area is fixed and the area condition thereof is arbitrarily settable.

The relationship between the operation direction of the operating members 41 and 42 and the change (increase/decrease of the size) of the focus target area S may be reverse to that described in Embodiment 2. Furthermore, a configuration can be employed in which the relationship between the operation direction of the operating members 41 and 42 and the change of the focus target area S is arbitrarily settable.

In addition, although the change amount of the focus target area S for one detection signal output from the contact switches 20a to 20d and the detecting switch 44 is fixed in this embodiment, the change of the focus target area S may be continued while the detection signal is output. For example, a continuous movement of the focus target area S in the same direction in the image-taking screen may be performed while a pushing operation of the operating members 41 and 42 is continued.

Further, although this embodiment assigns the function to change the size of the focus target area S to the rotational operation of the operating members 41 and 42, the function to be assigned to the rotational operation of the operating members 41 and 42 is not limited thereto. For example, a function to change the aspect ratio or the shape of the focus target area S can be assigned, and a function to fix the position of the focus target area S in the image-taking screen and release it can be assigned.

Moreover, although Embodiment 1 employs the configuration in which the operating member 14 is movable in the direction orthogonal to the optical axis O and Embodiment 2 employs the configuration in which the operating members 41 and 42 are rotatable around the optical axis O, a configuration can be employed in which an operating member is movable in a direction parallel to the optical axis O.

Furthermore, although Embodiments 1 and 2 employ the ring-like shaped operating member, an arc-like shaped operating member which lacks a part of a ring can be employed. In addition, the outer circumferential portions of these operating members may have a shape fitting to a finger's shape of the operator.

Furthermore, although Embodiments 1 and 2 employ a switch as the detector, a photo reflector, a photo interrupter, an encoder, a potentiometer, and the like can be employed as the detector to control the change of the position or the size of the focus target area S based on the position, movement amount, or moving speed of the operating member. The detector to detect the operation of the operating member can be placed inside the grip portion.

The position of the operating member is not limited to a position near the focus ring 12 as the above-described embodiments. The position of the operating member may be a position where the operating member constitutes a part of the outer circumference of the lens barrel 11, for example, a position near the zoom ring 13 or the iris ring 14. Further, the position of the operating member may be placed on the outer circumference of other operating ring such as the focus ring 12.

As described above, according to the autofocus lens apparatus of the embodiments, the position and size of the focus target area can be changed easily by the operation of the operating member provided on the outer circumference of the lens barrel. Therefore, it is possible to taking images smoothly.

In addition, since the operating member enables the direct movement of the focus target area to a desired position, it is possible to change the focus target area more quickly than a case where a sequential operation to select the focus target area is required.

Further, according to the camera system of the present invention which is constituted by attaching the above-described autofocus lens apparatus to the image-taking apparatus such as a television camera, since the operating member enables the direct movement of the focus target area to a desired position, image disturbance caused by the sequential operation to select the focus target area is prevented.

Furthermore, the present invention is not limited to these preferred embodiments and various variations and modifications may be made without departing from the scope of the present invention.

This application claims a foreign priority benefit based on Japanese Patent Applications Nos. 2005-168514, filed on Jun. 8, 2005, 2005-266062, filed on Sep. 13, 2005, and 2006-145356, filed on May 25, 2006, each of which is hereby incorporated by reference herein in its entirety as if fully set forth herein.

What is claimed is:

1. An autofocus lens apparatus which includes a focusing optical member movable in a lens barrel of the lens apparatus and automatically drives the focusing optical member on the basis of an image signal of a focus target area in an image-taking region to control the focusing optical member to an in-focus state, the autofocus lens apparatus comprising:
   an operating member which is placed outside the lens barrel and movable in a direction orthogonal to an optical axis of the lens barrel;
   a detector which detects the movement of the operating member; and
   a controller which moves the focus target area in a direction of the movement of the operating member on the basis of a signal from the detector.

2. The autofocus lens apparatus according to claim 1, wherein the operating member has a ring-like or arc-like shape centering on the optical axis.

3. The autofocus lens apparatus according to claim 1, further comprising a switch to change the focus target area to a predetermined set area.

4. The autofocus lens apparatus according to claim 3, further comprising a setting member to change the set area at operator's discretion.

5. The autofocus lens apparatus according to claim 1, further comprising a setting member to change the focus target area, which is set when the lens apparatus starts its operation, at operator's discretion.

6. The autofocus lens apparatus according to claim 1, further comprising a memory which stores the last focus target area when the lens apparatus stops its operation,
   wherein the controller sets the focus target area to the last focus target area when the lens apparatus restarts its operation.

7. The autofocus lens apparatus according to claim 1, wherein a change of the focus target area is displayed on a viewfinder.

8. A camera system comprising:
   the autofocus lens apparatus according to claim 1; and
   an image-taking apparatus.

9. An autofocus lens apparatus which includes a focusing optical member movable in a lens barrel of the lens apparatus and automatically drives the focusing optical member on the basis of an image signal of a focus target area in an image-taking region to control the focusing optical member to an in-focus state, the autofocus lens apparatus comprising:
   an operating member which is placed outside the lens barrel and is rotatable around an optical axis of the lens barrel;
   a detector which detects the rotation of the operating member; and
   a controller which changes the size of the focus target area on the basis of a signal from the detector.

10. The autofocus lens apparatus according to claim 9, wherein the controller increases the size of the focus target area according to the rotation of the operating member in one direction, and decreases the size of the focus target area according to the rotation of the operating member in the other direction.

11. The autofocus lens apparatus according to claim 9, wherein the operating member has a ring-like or arc-like shape centering on the optical axis.

12. The autofocus lens apparatus according to claim 9, further comprising a switch to change the focus target area to a predetermined set area.

13. The autofocus lens apparatus according to claim 12, further comprising a setting member to change the set area at operator's discretion.

14. The autofocus lens apparatus according to claim 9, further comprising a setting member to change the focus target area, which is set when the lens apparatus starts its operation, at operator's discretion.

15. The autofocus lens apparatus according to claim 9, further comprising a memory which stores the last focus target area when the lens apparatus stops its operation,
   wherein the controller sets the focus target area to the last focus target area when the lens apparatus restarts its operation.

16. The autofocus lens apparatus according to claim 9, wherein a change of the focus target area is displayed on a viewfinder.

17. A camera system comprising:
   the autofocus lens apparatus according to claim 9; and
   an image-taking apparatus.

* * * * *